United States Patent [19]
Harries

[11] Patent Number: 6,164,068
[45] Date of Patent: Dec. 26, 2000

[54] VARIABLE PRESSURE HYDRAULIC SYSTEMS

[75] Inventor: David Anthony Harries, Welford on Avon, United Kingdom

[73] Assignee: Luk Leamington Limited, Warwickshire, United Kingdom

[21] Appl. No.: 09/310,704

[22] Filed: May 7, 1999

[30] Foreign Application Priority Data

May 20, 1998 [GB] United Kingdom .................. 9810793

[51] Int. Cl.$^7$ ........................................... F15B 1/033
[52] U.S. Cl. ................. 60/418; 137/596.13; 137/596.17; 137/625.65
[58] Field of Search .................. 137/596.13, 596.17, 137/625.65; 60/418

[56] References Cited

U.S. PATENT DOCUMENTS 4,303,089  12/1981  Gage et al. .

FOREIGN PATENT DOCUMENTS 2297069  7/1996  United Kingdom .
2301327  12/1996  United Kingdom .

OTHER PUBLICATIONS

International Publication No. WO 97/05410 Published Feb. 13, 1997.

Primary Examiner—Gerald A. Michalsky
Attorney, Agent, or Firm—Darby & Darby

[57] ABSTRACT

A variable pressure hydraulic system includes a hydraulic pressure source which is selectively connected to a hydraulic system or to drain, via a control valve and a pressure transducer; the control valve in a first position isolating the pressure source from the hydraulic system and connecting it to the pressure transducer and in a second position connecting the pressure source to the pressure transducer and the hydraulic system.

4 Claims, 3 Drawing Sheets

VARIABLE PRESSURE HYDRAULIC SYSTEMS

BACKGROUND TO THE INVENTION

The present invention relates to variable pressure hydraulic systems, for example, gear ratio selector mechanisms of the type covered by the applicants International Patent Application WO97/05410.

In variable pressure hydraulic systems, hydraulic fluid may be supplied to the system from a hydraulic pressure accumulator, via a solenoid operated proportional flow control valve, which controls pressure in the system by selectively connecting the system to the pressure accumulator or to drain. The solenoid valve is controlled electronically, a pressure transducer being provided in the system to provide an indication as to when the required pressure has been attained and/or the solenoid valve must be controlled to permit fluid into or out of the system.

With such systems, it is necessary to have means to measure the pressure of fluid in the pressure accumulator, so that the pressure accumulator may be charged to the required pressure, if required.

Hitherto, separate pressure transducers have been used to monitor the pressure in the pressure accumulator and the pressure in the hydraulic systems. In WO97/05410, it is proposed that the pressure transducer in the hydraulic gear ratio selector mechanism may be used to monitor pressure in the pressure accumulator, by switching further valves to a null position thereby isolating the gear ratio selector mechanism from the system, while the main valve connects the pressure accumulator to the system. The null position of the further valve means is however a position intermediate of positions which normally connect the actuators to pressure or drain and when conventional flow control valves are used for this purpose, significant leakage problems can be experienced.

In accordance with the present invention the main solenoid proportional flow control valve is modified to provide separate connections between the pressure accumulator and a pressure transducer and the pressure transducer and a hydraulic control system, so that a single pressure transducer may be used to monitor pressure in the hydraulic control system and the pressure accumulator.

SUMMARY OF THE INVENTION

According to one aspect of the present invention, a variable pressure hydraulic system comprises a hydraulic pressure source, the hydraulic system being selectively connected to the pressure source and/or to drain, via a control valve and a pressure transducer; the pressure transducer and pressure source being connected to the valve such that; in a first position of the valve, the pressure source is isolated from the hydraulic system and connected to the pressure transducer; and in a second position of the valve, the pressure source and the pressure transducer are connected to the hydraulic system.

Preferably the valve is a solenoid actuated valve and more preferably a solenoid actuated proportional flow control valve.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
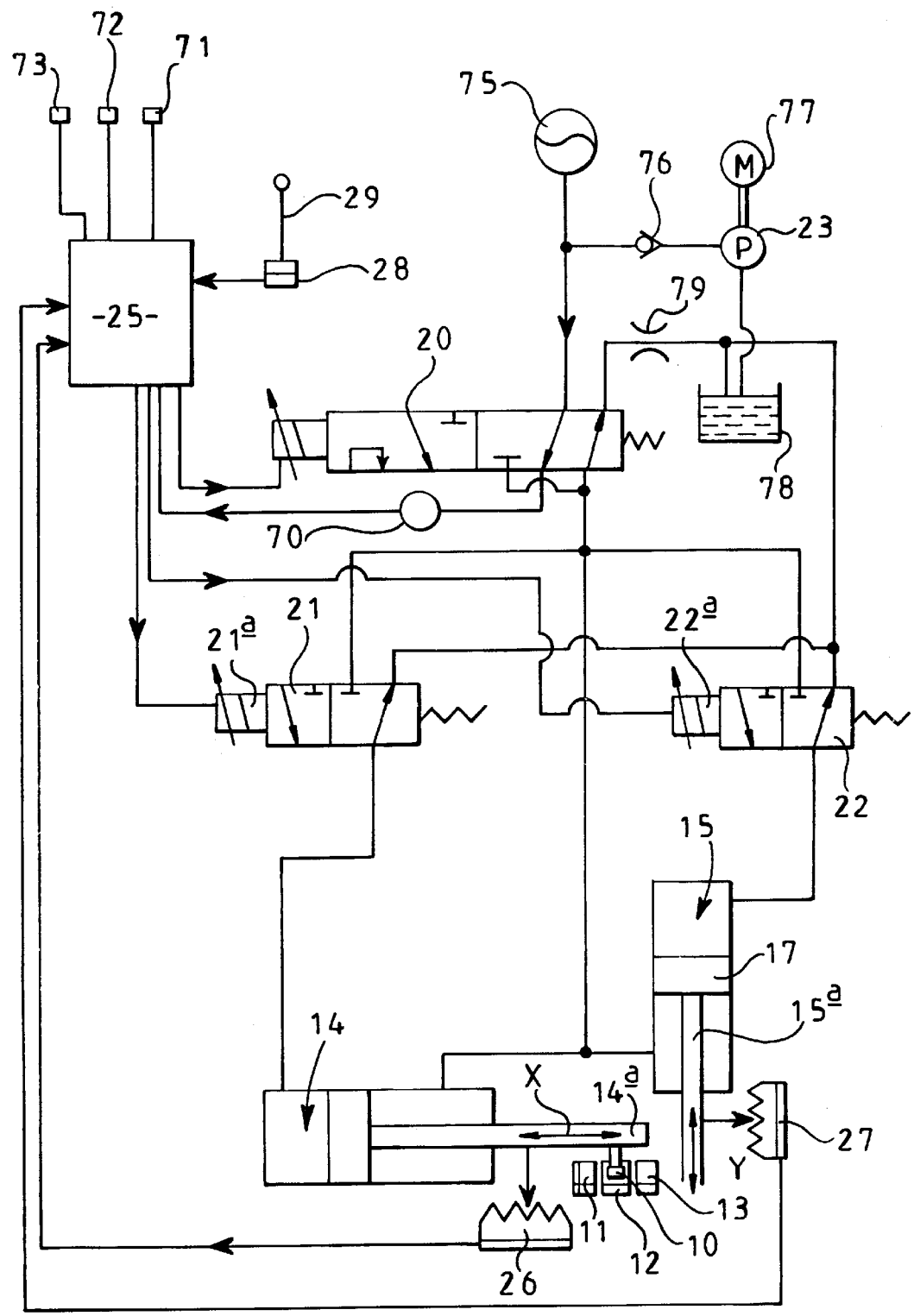
FIG. 1 is an illustration of a hydraulic system in accordance with the present invention.

FIG. 1 illustrates a hydraulic gear ratio selector mechanism of the type disclosed in the applicants International Patent Application WO97/05410.

The gear ratio selector mechanism comprises a pair of hydraulic actuators 14 and 15, which control movement of a selector member 10. Movement of the actuators 14 and 15 is in turn controlled by a pair of solenoid operated proportional flow control valves 21 and 22, in accordance with electrical control signals from a control unit 25. The actuators 14 and 15 are selectively connected to the pressure accumulator 75 or to a reservoir 78, via a third solenoid operated proportional flow control valve 20. The proportional flow control valve 20, under the control of control unit 25, varies the pressure in the hydraulic system 14, 15, 21, 22 to vary the loads applied to the selector member 10 by actuators 14 and 15, in the manner disclosed in WO97105410.

Figure 2:
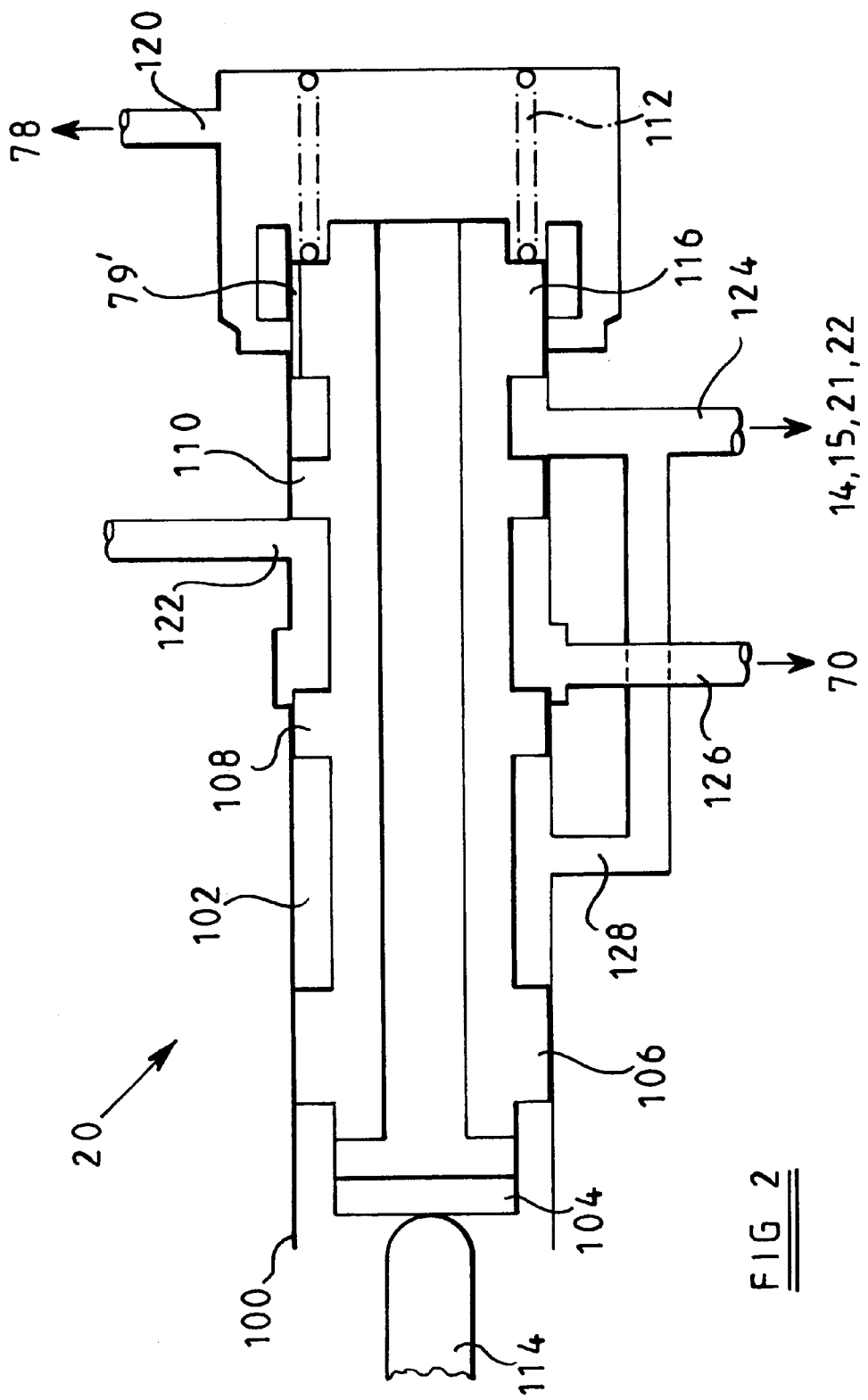
FIG. 2 is an enlarged view of the main control valve used in the system illustrated in FIG. 1.

As illustrated in greater detail in FIG. 2, the solenoid operated proportional flow control valve 20 comprises a housing 100 defining a closed bore 102. A spool 104 is slidingly located in the bore 102, the spool 104 having three axially spaced lands 106, 108 and 110, the lands 106, 108 and 110 sealingly engaging the bore 102.

The spool 104 is biased by spring means 112, away from the closed end of bore 102 towards a solenoid actuator 114. The solenoid actuator 114 may be energised by an electric current, to urge spool 104 towards the right (as illustrated in FIG. 2) against the load applied by spring means 112. The degree to which the spool 104 is moved to the right depends on the energising current applied to the solenoid actuator 114.

The housing 100 defines five ports; a first port 120 located at the closed 4 end of the bore 102 which is remote from the solenoid actuator 114; a second port 122 located axially intermediate of the first port 120 and the solenoid actuator 114; a third port 1 24 located axially intermediate of the first and second ports 120, 122; a fourth port 126 located axially intermediate of the second port 122 and solenoid actuator 114; and a fifth port 128 located intermediate of the fourth port 126 and the solenoid actuator 114.

Port 120 of valve 20 is connected to the reservoir 78; port 122 is connected to pressure accumulator 75; port 124 is connected to the hydraulic system 14, 15, 21, 22 controlling the selector member 10; port 126 is connected to a pressure transducer 70; and port 128 is connected to the port 124.

When the solenoid actuator 114 is de-energised, the spool 104 will be urged hard over to the left to a first position as illustrated in FIG. 1, by the spring means 112. In this first position, port 124 is connected via an axial groove in a fourth land 116 which forms the restrictor 79, to port 120, thereby connecting the hydraulic system 14, 15, 21, 22 to the reservoir, so that the pressure across actuators 14 and 15 will be balanced and the gear ratio selector mechanism will remain in the selected gear or in neutral as appropriate. Moreover, in this first position, the pressure accumulator 75 and pressure transducer 70 are isolated from the hydraulic system 14, 15, 21, 22, the pressure accumulator 75 being connected to the pressure transducer 70. The pressure transducer 70 may consequently be used to monitor the pressure in pressure accumulator 75 and, via the control unit 25, control pump 23 to recharge the pressure accumulator 75, as required.

In order to change the gear ratio, the solenoid actuator 114 is energised to urge the spool 104 to the right to a second position. In this second position the connection between the reservoir 78 and hydraulic system 14, 15, 21, 22, is closed thereby closing the connection between pressure accumulator 75 and pressure transducer 70; and connecting the hydraulic system 14, 15, 21, 22 to the hydraulic accumulator 75. In the second position the hydraulic system 14, 15, 21, 22 will thus be pressurised permitting actuators 14 and 15 to move the selector member 10 under the control of valves 21 and 22. At the same time ports 126 and 128 are connected between lands 106 and 108, the pressure transducer 70 thereby being connected to the hydraulic system 14, 15, 21, 22, via the interconnection between ports 124 and 128. The pressure in the hydraulic system 14, 15, 21, 22 may thus be controlled via the control unit 25 and solenoid actuator 114, to give the required pressure for the driving conditions, in response to signals from the pressure transducer 70. This is achieved by controlling valve 20 very accurately and quickly, opening the hydraulic system 14, 15, 21, 22 to pressure accumulator 75 if pressure is too low and to reservoir 78 if the pressure is too high. This is preferably done using control pulses to the solenoid actuator 114, which will cause the spool 104 to oscillate continually between the connections between the pressure accumulator 75 and reservoir 78. The pressure in the hydraulic system 14, 15, 21, 22 is preferably controlled using a pulse width modulation technique, to energise the solenoid actuator 114.

With the arrangement disclosed above, a single pressure transducer 70 may be used to monitor pressure in the hydraulic system 14, 15, 21, 22 to provide a feed-back for controlling the solenoid operated proportional flow control valve 20 and also to monitor pressure in the pressure accumulator 75 for recharging purposes, when the gear ratio shift mechanism is inoperative.

Figure 3:
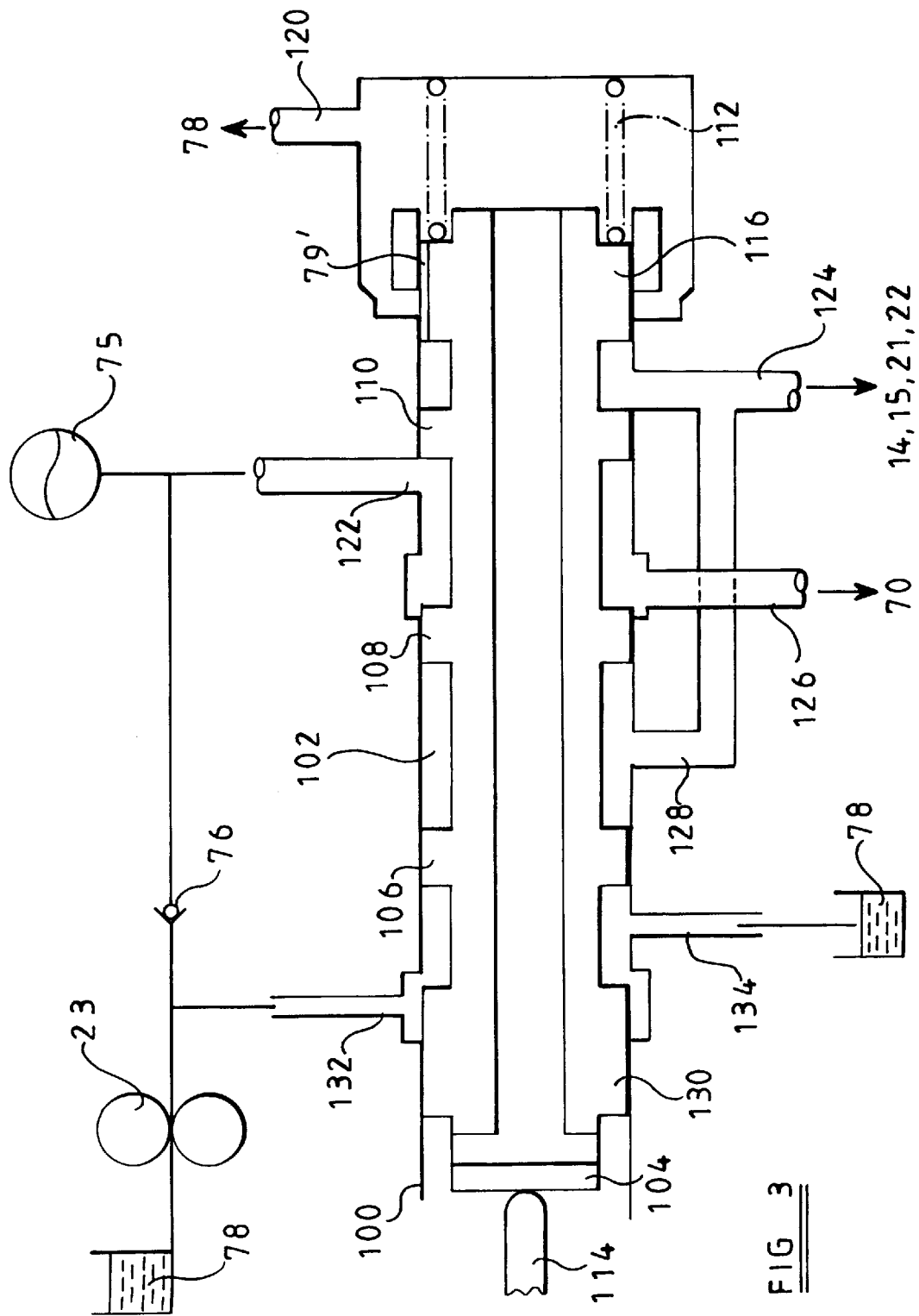
FIG. 3 is a view similar to FIG. 2 of a modification to the main control valve.

In the modification illustrated in FIG. 3, an additional land 130 is provided on the spool 104 adjacent the open end of bore 102. A pair of additional ports 132 and 134 are provided adjacent that end of the bore 102. Port 132 is connected to the hydraulic circuit between the pump 23 and a non-return valve 76, and port 134 is connected to the reservoir 78.

The land 130 and ports 132 and 134 are arranged such that when the spool 104 in its first position as illustrated in FIG. 3, port 132 will be connected to port 134 between lands 130 and 106. In this first position, the pump 23 may be started under low load conditions, the pumped fluid being recirculated back to the reservoir 78.

Movement of the spool 104 to the second position will first close the connection between ports 132 and 134, so that at an intermediate position full pump pressure will be available to recharge the pressure accumulator 75 while the pressure accumulator 75 remains connected to the pressure transducer 70 via ports 122 and 126.

Further movement of spool 104 to the second position will then close the connection between ports 122 and 126, connecting port 122 with port 124 and port 126 with port 128, as described above.

While in the above embodiments the present invention has been described with reference to a gear ratio selector mechanism, the invention may be used in any circuit in which a proportional flow control valve is used to control pressure in a hydraulic circuit fed from a pressure source.

I claim:

1. A variable pressure hydraulic system comprising a hydraulic pressure source, at least one hydraulic actuator being selectively connected to at least one of the pressure source and a drain via a control valve and a pressure transducer; said control valve including a valve member and means for moving the valve member between a first position in which the pressure source is isolated from said at least one hydraulic actuator, the pressure source being connected to the pressure transducer; and a second position in which both the pressure source and said at least one hydraulic actuator are connected to the pressure transducer.

2. A variable pressure hydraulic system according to claim 1 in which the control valve is a solenoid actuated proportional flow control valve.

3. A variable pressure hydraulic system according to claim 1 in which the valve has a first port connected to a hydraulic accumulator; a second port connected to a hydraulic fluid reservoir; a third port connected to at least one hydraulic actuator; a fourth port connected to the pressure transducer and a fifth port connected to the third port; the valve means; in the first position interconnecting the first and fourth ports but isolating the first and fourth ports from the second, third and fifth ports; and in the second position interconnecting the first and third ports and the fourth and fifth ports.

4. A variable pressure hydraulic system according to claim 3 in which a sixth port is connected to the output side of a pump and a seventh port is connected to the reservoir, the sixth port being interconnected with the seventh port when the valve is in the first position, connection between the sixth and seventh ports being closed at a position of the valve intermediate of the first and second positions.

* * * * *

UNITED STATES PATENT AND TRADEMARK OFFICE
CERTIFICATE OF CORRECTION

PATENT NO. : 6,164,068
DATED : December 26, 2000
INVENTOR(S) : David Anthony HARRIES It is certified that error appears in the above-identified patent and that said Letters Patent is hereby corrected as shown below:

Title page item,

[75], change "WELFORD ON AVON" to - - WARWICKSHIRE- -.

Signed and Sealed this

Twenty-second Day of May, 2001

Attest:

NICHOLAS P. GODICI

Attesting Officer     *Acting Director of the United States Patent and Trademark Office*